(12) United States Patent
Cintora et al.

(10) Patent No.: US 8,966,941 B2
(45) Date of Patent: Mar. 3, 2015

(54) PROCESS FOR OBTAINING GLASS AND GLASS OBTAINED

(75) Inventors: Octavio Cintora, Taverny (FR);
Thomas Schuster, Wuerselen (DE);
Byoung-Ouk Kim, Dongjak-Gu (KR);
Kidong Moon, Jeollabuk-Do (KR);
Junbo Choi, Jeollabuk-Do (KR); Pedro Silva, Douai (FR)

(73) Assignee: Saint-Gobain Glass France, Courbevoie (FR)

( * ) Notice: Subject to any disclaimer, the term of this patent is extended or adjusted under 35 U.S.C. 154(b) by 1065 days.

(21) Appl. No.: 13/057,428

(22) PCT Filed: Sep. 1, 2009

(86) PCT No.: PCT/FR2009/051655
§ 371 (c)(1),
(2), (4) Date: Feb. 3, 2011

(87) PCT Pub. No.: WO2010/023419
PCT Pub. Date: Mar. 4, 2010

(65) Prior Publication Data
US 2011/0135938 A1 Jun. 9, 2011
US 2012/0121915 A2 May 17, 2012

(30) Foreign Application Priority Data

Sep. 1, 2008 (FR) ..................... 08 55847
Feb. 27, 2009 (FR) ..................... 09 51243
Jun. 26, 2009 (KR) ............ 10-2009-0057687

(51) Int. Cl.
*C03B 5/173* (2006.01)
*C03B 5/225* (2006.01)
*C03B 5/237* (2006.01)
*C03B 5/235* (2006.01)
*C03C 3/078* (2006.01)

(52) U.S. Cl.
CPC ............ *C03B 5/235* (2013.01); *C03C 3/078* (2013.01)
USPC ............................ 65/134.4; 65/99.2; 65/134.1

(58) Field of Classification Search
CPC ........ C03B 5/173; C03B 5/2353; C03B 5/235
See application file for complete search history.

(56) References Cited

U.S. PATENT DOCUMENTS

| 4,432,780 A * | 2/1984 | Propster et al. ................. 65/473 |
| 4,599,100 A * | 7/1986 | Demarest, Jr. ............... 65/134.4 |
| 4,632,687 A * | 12/1986 | Kunkle et al. ..................... 65/27 |
| 5,030,594 A | 7/1991 | Heithoff |
| 5,609,662 A * | 3/1997 | Kobayashi et al. ........... 65/135.1 |
| 6,218,323 B1 | 4/2001 | Bretschneider et al. |
| 6,237,369 B1 * | 5/2001 | LeBlanc et al. ............... 65/134.1 |
| 6,461,736 B1 | 10/2002 | Nagashima et al. |
| 6,519,973 B1 * | 2/2003 | Hoke et al. ................... 65/134.4 |
| 6,532,771 B1 * | 3/2003 | Kobayashi et al. .......... 65/134.4 |
| 8,304,358 B2 * | 11/2012 | Shelestak et al. ................ 501/70 |
| 2001/0039813 A1 * | 11/2001 | Simpson et al. .............. 65/134.4 |
| 2003/0114291 A1 * | 6/2003 | Koyama et al. .................. 501/64 |
| 2003/0125188 A1 | 7/2003 | Koyama et al. |
| 2004/0145297 A1 | 7/2004 | Nakashima et al. |
| 2004/0229744 A1 * | 11/2004 | Heithoff .......................... 501/72 |
| 2005/0188725 A1 * | 9/2005 | Tullman et al. ............... 65/134.3 |
| 2007/0119213 A1 * | 5/2007 | Simpson et al. ................. 65/157 |
| 2010/0313604 A1 * | 12/2010 | Watson et al. ............... 65/136.3 |
| 2011/0098171 A1 * | 4/2011 | Pedeboscq et al. ............. 501/32 |
| 2011/0271717 A1 * | 11/2011 | Watson et al. ............... 65/134.4 |
| 2013/0038940 A1 * | 2/2013 | Shelestak et al. ............. 359/601 |
| 2013/0180290 A1 * | 7/2013 | Kobayashi et al. .......... 65/134.4 |
| 2013/0276481 A1 * | 10/2013 | Kobayashi et al. .......... 65/134.4 |

FOREIGN PATENT DOCUMENTS

| EP | 1 281 687 | 2/2003 |
| EP | 1 291 330 | 3/2003 |
| EP | 1 477 464 | 11/2004 |
| EP | 1477464 | 11/2004 |
| EP | 1 686 316 A1 | 8/2006 |

(Continued)

OTHER PUBLICATIONS

International Search Report issued Jan. 18, 2010 in PCT/FR09/051655 filed Sep. 1, 2009.

(Continued)

*Primary Examiner* — Jason L Lazorcik
(74) *Attorney, Agent, or Firm* — Oblon, McClelland, Maier & Neustadt, L.L.P.

(57) ABSTRACT

The object of the invention is a continuous method for obtaining glass, comprising steps consisting of:
  charging raw materials upstream of a furnace, along which a plurality of burners is disposed,
  obtaining a mass of molten glass, and then
  leading said mass of molten glass to a zone of the furnace situated further downstream, at least one burner disposed in the region of this zone being fed with an over-stoichiometric quantity of oxidant, and then,
  forming a glass sheet, said glass sheet having a chemical composition that comprises the following constituents in an amount varying within the weight limits defined below:

| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |
| $SO_3$ | 0.1-0.4% |
| $Fe_2O_3$ (total iron) | 0 to 0.015%, |
| Redox | 0.1-0.3. |

10 Claims, No Drawings

(56) References Cited

FOREIGN PATENT DOCUMENTS

| | | |
|---|---|---|
| EP | 1686316 | 8/2006 |
| JP | 2004-15359 | 1/2004 |
| JP | 2004-115359 | 1/2004 |
| JP | 2007 238398 | 9/2007 |
| KR | 2003-0021144 | 3/2003 |
| KR | 2005 0004761 | 1/2005 |
| WO | 2008/068965 | 6/2008 |
| WO | 2008068965 | 6/2008 |
| WO | 2009/125133 | 10/2009 |

OTHER PUBLICATIONS

Third-Party Submission under 37 CFR 1.99 dated Aug. 1, 2011.
Third-Party Submission (Claim Charts for US 2011/0135938).
Herausgegeben, et al., "Glastechnische Fabrikationsfehler", pp. 392-395, w/English Translation.
Dritte, vollig neu bearbeitete Auflage, "Glastechnische Fabrikationsfehler", 8 Farbstich des Glases, pp. 392-395.

* cited by examiner

PROCESS FOR OBTAINING GLASS AND GLASS OBTAINED

The present invention relates to a method for obtaining glass and to a glass composition capable of being obtained by this method. It relates in particular to a soda-lime-silica glass intended for the production of objects, in particular being in the form of flat glass sheets, said composition giving these said objects high transmission properties for visible and infrared radiation. It also relates to the method enabling said composition to be obtained.

Although not limited to such an application, the invention will more particularly be described with reference to applications in the field of flat glass, notably glass capable of being obtained by the float method consisting of pouring molten glass onto a bath of molten metal (in particular tin).

In some fields of the art, it is essential that the glasses employed have extremely high transmission for visible and/or infrared radiation, notably greater than 90%. This is the case for example in applications where glass is used in the form of a substrate that covers photovoltaic cells or solar cells. In point of fact in this case, the quantum efficiency of the cells may be largely affected even by a very small reduction in transmission of visible or infrared radiation.

Transmission in the visible or infrared range is generally expressed in the form of a transmission factor incorporating, over a certain part of the spectrum, the transmission for each wavelength taking account of a particular spectral distribution and as appropriate the sensitivity of the human eye. In order to quantify the transmission of the glass in the visible range, a light transmission factor is thus defined, called light transmission, often abbreviated to "$T_L$", calculated between 380 and 780 nm and based on a glass thickness of 3.2 mm or 4 mm, according to ISO standard 9050:2003, thus taking into consideration the D65 illuminant as defined by ISO/CIE standard 10526 and standard colorimetric observer C.I.E. 1931 as defined by ISO/CIE standard 10527. In order to quantify transmission of the glass in the range encompassing the solar visible and infrared (also called "near infrared") an energy transmission factor is defined called "energy transmission", abbreviated to "$T_E$", calculated according to ISO standard 9050 and reduced to a glass thickness of 3.2 mm or 4 mm. According to ISO standard 9050, the wavelength range used for the calculation extends from 300 to 2500 nm. However, some values will be given in the remainder of the text while limiting the calculation to wavelengths extending from 400 to 1100 nm.

It is known, in order to reach values of $T_L$ and $T_E$ greater than 90%, to reduce by a maximum the total iron oxide content. Iron oxide, present as an impurity in most natural raw materials used in glassmaking (sand, feldspar, limestone, dolomite, etc), absorbs both in the visible and near ultraviolet range (absorption due to the ferric ion $Fe^{3+}$) and especially in the visible and near infrared (absorption due to the ferrous ion $Fe^{2+}$). With ordinary natural raw materials, the iron oxide content by weight is of the order of 0.1% (1000 ppm). Transmissions of greater than 90% require however a reduction of the iron oxide content to less than 0.02% or 200 ppm, or even less than 0.01% (100 ppm), which makes it necessary to choose particularly pure raw materials and increase the cost of the final product.

In order to increase transmission of the glass still further, it is also known to reduce the ferrous iron content to the profit of the ferric iron content, and therefore to oxidize the iron present in the glass. In this way, glasses are aimed at having as small as possible "redox", ideally zero or virtually zero, the redox being defined as the ratio between the FeO content by weight (ferrous iron) and the total iron oxide content by weight (expressed in the form of $Fe_2O_3$). This number may vary between 0 and 0.9, zero redoxes corresponding to a totally oxidized glass.

Glasses containing normal iron oxide contents, of the order of 1000 ppm or more, naturally have redoxes of the order of 0.25. On the other hand, glasses containing small quantities of iron oxide, notably less than 200 ppm, or even less than 150 ppm, have a natural tendency to have high redoxes, greater than 0.4, or even than 0.5. This tendency is probably due to a displacement of the oxydoreduction equilibrium of iron as a function of the iron oxide content.

Various solutions have been proposed for oxidizing iron oxide as much as possible, which contribute to obtaining very low redoxes, less than 0.2. It is known for example from U.S. Pat. No. 6,844,280 to add cerium oxide ($CeO_2$) to glass. Cerium oxide is however expensive and capable of being the origin of a process called "solarization", in which transmission of the glass falls considerably following absorption of ultraviolet radiation. It is also known to add antimony oxide ($Sb_2O_3$) or arsenic oxide ($As_2O_3$), oxides traditionally used as glass refining agents and that have the particular property of oxidizing iron. Use of $Sb_2O_3$ is for example described in US application 2006/249199 or FR 2317242. These oxides prove however incompatible with the float glass method. It would seem that under reducing conditions necessary for non-oxidation of the bath of tin, part of these oxides volatilize and then condense on the glass sheet as it forms, generating an undesirable haze. Vanadium and manganese oxides have also been proposed with the aim of oxidizing iron.

Oxidation of glass by chemical means involves a high cost and/or is not compatible with the float glass method. Moreover, production of very oxidized glasses has been revealed to reduce considerably the life of furnaces. The very high radiative conductivity of a very oxidized glass bath (and thus one with high transmission in the infrared), generates very much higher hearth temperatures. The result is increased corrosion of the refractories constituting the hearth of the furnace and to a reduction in the life of the furnace.

The object of the present invention is to provide a lower cost method making it possible to obtain extra-clear glass with an intermediate redox without using chemical oxidation means. The object is also to provide a glass sheet having a low iron oxide content and an intermediate redox.

To this end, the object of the invention is a continuous method for obtaining glass, comprising steps consisting of:
  charging raw materials upstream of a furnace, along which a plurality of burners is disposed,
  obtaining a mass of molten glass, and then
  leading said mass of molten glass to a zone of the furnace situated further downstream, at least one burner disposed in the region of this zone being fed with an over-stoichiometric quantity of oxidant, and then,
  forming a glass sheet, said glass sheet having a chemical composition that comprises the following constituents in an amount varying within the weight limits defined below:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |

-continued

| | |
|---|---|
| SO₃ | 0.1-0.4% |
| Fe₂O₃ (total iron) | 0 à 0.015%, |
| Redox | 0.1-0.3. |

In all the text, percentages are percentages by weight.

The fusion furnace generally consists of refractories, generally ceramics such as silicon oxide, aluminum oxide, zirconium oxide, chromium oxide, or solid solutions of aluminum, zirconium and silicon oxides. The furnace generally has an arch supported by uprights forming the sidewalls of the furnace, front and rear walls and a hearth. In a continuous melting method, the upstream part of the furnace may be distinguished corresponding to the zone for charging in raw material, and then zones further downstream: the fusion zone in which the raw materials are converted into molten glass and then the refining zone in which any gaseous inclusion is removed from the bath of molten glass, then the cooling-down zone, in which glass is progressively cooled to the forming temperature, and finally the thermal conditioning zone where the glass is held at its forming temperature, before the forming zone. The forming zone is not an integral part of the furnace.

A burner is understood to mean any association of at least one injector of fuel (generally gaseous, such as natural gas or propane, or liquid such as fuel oil) and at least one injector for oxidant (generally air or oxygen) the association being disposed so that is can develop a flame by combustion between fuel and oxidant.

The inventors have demonstrated that combustion that is over-stoichiometric in oxidant in a downstream part of the furnace made it possible to obtain glasses low in iron oxide and with an intermediate redox, glasses that could not previously be obtained. This result was particularly surprising since it was usually thought that in a furnace, taking into account the large volume of glass relative to a free surface area, oxidation of a glass bath by maintaining a more oxygenated atmosphere in the region of the glass surface was not possible.

The furnace preferably has several overhead burners disposed in the region of the sidewalls of the furnace, each of said burners being able to develop a flame transversely to the axis of the furnace. An "overhead burner" is understood to mean a burner developing a flame situated above the molten glass bath and capable of heating the glass bath by radiation. It is also possible for the furnace to have other types of burners, notably burners able to heat the glass bath by conduction, for example burners situated in the arch and/or in the front or back walls and of which the flame impacts the glass bath, or moreover immersed burners, in the sense that the flame is developed within the glass bath.

Overhead burners are preferably disposed regularly upstream to downstream and/or are arranged in pairs of burners facing each other, the burners of each pair operating alternately so that at a given instant only burners disposed in the region of one of the sidewalls develop a flame.

This type of furnace is sometimes called a "transverse burner furnace". Alternating the operation of pairs of burners makes it possible to use regenerators, through which the combustion gas and oxidant are obliged to pass. Consisting of stacks of refractory parts, regenerators make it possible to store heat emitted by the combustion gas and to give this heat back to the oxidant gas. In a first phase of the alternation, regenerators situated in the region of the burners that are not in operation (these burners are disposed in the region of the first wall) store energy emitted by the flames developed by the burners situated in the region of the second wall, facing the first wall. In a second phase of the alternation, burners disposed in the region of the second wall stop operating, while burners disposed in the region of the first wall are put into operation. The combustion gas (in this case generally air), which passes into the regenerators, is then preheated, which makes substantial energy savings possible.

In order to optimize melting, the furnace preferably has between 6 and 8 pairs of burners and only the two or three pairs of burners situated furthest downstream, or the last pair of overhead burners situated further downstream, are fed with an over-stoichiometric quantity of oxidant. The other burners, situated further upstream, are preferably fed by a stoichiometric or sub-stoichiometric quantity of oxidant.

The furnace preferably has, from upstream to downstream, a first chamber delimiting a glass melting zone and then a refining zone and then a second chamber delimiting a cooling zone for molten glass, all the burners being disposed in the region of the first chamber. In general, a transition zone called a restriction and being in the form of a chamber with a narrower cross section separates the two previously described chambers.

Refining is understood to mean removal of gaseous inclusions incorporated in the glass mass, in particular on account of decarbonation reactions of some raw materials. In the abovementioned type of furnace, the refining zone is situated downstream of the first chamber of the furnace.

The, or each, burner fed with an over-stoichiometric quantity of oxidant is then preferably situated in the region of the glass refining zone. It is in point of fact in this refining zone that oxidation of the glass is most effective.

The burners are preferably fed with air and a fuel. Oxygen may also be used, as well as any type of oxygen-enriched air. Oxygen is more costly to use but makes it possible not to use regenerators.

The fuel is preferably chosen from natural gas or fuel oil or any mixtures thereof. The use of fuel oil is preferred since it makes it possible to obtain more useful redoxes.

The over-stoichiometric quantity of oxidant is preferably such that the molar ratio of oxygen to fuel is greater than or equal to 1.05, notably 1.1, and/or less than or equal to 1.5, notably 1.3.

The partial pressure of oxygen above the glass bath is preferably between 4 and 7%. Below 4% it is difficult to control the redox, while above 7% energy consumption problems are presented. Control of the redox by means of the partial pressure of oxygen is achieved according to the following chemical reaction:

$$O_2 + 4Fe^{2+} \rightarrow 2O^{2-} + 4Fe^{3+}$$

Heat convection phenomena inside the furnace create two bands (or streams) of glass circulation, a first band in the region of the fusion zone extending from the zone for introducing raw materials to the hot point, in which the hot glass surface is brought to the zone for introducing raw materials, and a second circulation band from the hot point to the outlet from the furnace, thus in the region of the refining zone and of the cooling zone, in which part of the surface glass dives to the hearth in order to return to the hot point. The existence of these bands contributes widely to the chemical uniformity of the glass. Strict control of the length of each of the bands is necessary in order to ensure good yield. Generally, in the case where a low iron content glass is fused, the hearth temperature is increased in comparison with the case of melting glass with a normal iron content. For this reason, the first band is shortened and the second band is extended, which may cause bubbling problems associated with the quantity of residual $SO_3$ in the glass.

Surprisingly, holding a high oxygen partial pressure, higher than in the case of melting glass with a normal iron content, makes it possible not to extend the second circulation band, for increased production stability and better yield.

The glass sheet is preferably formed by floating on a bath of tin. Other types of forming method may be employed, such as drawing methods, a draw-down method, a rolling method, a Fourcault method, etc.

The raw materials charged into a furnace are preferably powdered solid materials. Reference may particularly be made to sand, sodium carbonate, limestone, dolomite and feldspars. However, dolomite frequently contains iron oxide as an impurity so that it is preferably not employed within the context of the invention.

Sulfur ($SO_3$) is preferably added as sodium sulfate or calcium sulfate (called gypsum). In order to accelerate fusion, it is preferable to add a reducer such as coke jointly with sulfate. The quantity of sulfate added is preferably between 0.2 and 0.6%, notably between 0.3 and 0.5%, or even between 0.4 and 0.5%, expressed as percentages of $SO_3$ by weight. The quantity of coke is advantageously between 0 and 1000 ppm, or even between 50 and 120 ppm (1 ppm=0.0001%), notably between 60 and 80 ppm. It is also possible, in order to promote oxidation of iron, to introduce a nitrate, such as sodium nitrate.

Preferably, the glass sheet has a chemical composition that comprises the following constituents in an amount varying within the weight limits defined below:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |
| $SO_3$ | >0.2-0.4% |
| $Fe_2O_3$ (total iron) | 0 to 0.015%, |
| Redox | 0.2-0.30. |

The object of the invention is also a glass sheet having a chemical composition that comprises the following constituents in an amount varying within the weight limits defined below:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |
| $SO_3$ | 0.1-0.4% |
| $Fe_2O_3$ (total iron) | 0 to 0.02%, |
| Redox | 0.15-0.3. |

The method according to the invention is in point of fact specially adapted to obtaining such a glass sheet and, to the knowledge of the inventors, known methods do not enable such a product to be obtained.

This redox range makes it possible to obtain very satisfactory optical properties, while preserving a high furnace life.

The presence of iron in a glass composition may result from the raw materials, as impurities, or as an addition made deliberately to color the glass. It is known that iron exists in the structure of the glass in the form of ferric ions ($Fe^{3+}$) and ferrous ions ($Fe^{2+}$). The presence of $Fe^{3+}$ ions gives the glass a very light yellow coloration and enables ultraviolet radiations to be absorbed. The presence of $Fe^{2+}$ ions gives glass a more pronounced bluish green coloration and induces absorption of infrared radiation. Increasing the iron content in its two forms accentuates the absorption of radiation at the ends of the visible spectrum, this effect being made to the detriment of light transmission.

In the present invention, the $Fe_2O_3$ content (total iron) is preferably less than 0.015%, or even less than or equal to 0.012%, notably 0.010%, this in order to increase the optical transmission of the glass. The $Fe_2O_3$ content is preferably greater than or equal 0.005%, notably 0.008% so as not to increase the cost of the glass.

The redox is preferably greater than or equal to 0.15, and notably between 0.2 and 0.30, notably between 0.25 and 0.30. Very low redoxes contribute in point of fact to a reduction in the life of furnaces.

The presence of sulfur in the composition, of which the content is expressed as $SO_3$ whatever its actual form, generally results from the use of sulfates as refining agents. Sulfates, notably of sodium or calcium (gypsum) are added with the raw materials, generally jointly with a reducing agent such as coke. Decomposition of these sulfates within the glass bath makes it possible to refine the glass, that is to say to remove gaseous inclusions. It has also been observed that adding sulfate makes it possible to accelerate melting considerably, that is to say to reduce the time necessary for the more refractory materials (generally sand) to be perfectly dissolved in the glass bath. In order to obtain glass at least cost, with a very high melting rate, $SO_3$ contents are thus preferably greater than 0.2%. Above 0.4% there is a risk on the other hand of the appearance of sulfides, which have a significant coloring effect, and a risk of the appearance of foam or even of bubbling. The $SO_3$ content in the glass is preferably greater than or equal to 0.25% and/or less than or equal to 0.35%, notably 0.30%.

In glasses according to the invention, silica $SiO_2$ is generally kept within narrow limits for the following reasons. Above 75%, the viscosity of glass and its ability to devitrify increase strongly which makes it difficult to melt and flow onto the bath of molten tin. Below 60%, notably 64%, the hydrolytic resistance of glass decreases rapidly. The preferred content lies between 65 and 75%, notably between 71 and 73%.

Alumina $Al_2O_3$ plays a particularly important role in the hydrolytic resistance of glass. Its content preferably lies between 0 and 5%, notably between 0 and 3%. When glass according to the invention is intended to be used in hot humid environments, the alumina content is preferably greater than or equal to 1% or even 2%. A content between 0.5 and 1.5% is optimal.

The alkali metal oxides $Na_2O$ and $K_2O$ facilitate fusion of the glass and make it possible to adjust its viscosity at high temperatures in order to keep it close to that of a standard glass. $K_2O$ may be used up to 10% since beyond this a problem is presented of the high cost of the composition. In addition, increasing the percentage of $K_2O$ may essentially only be made to the detriment of $Na_2O$, which contributes to an increase in viscosity. The sum of the $Na_2O$ and $K_2O$ contents, expressed in weight percentages, is preferably equal to or greater than 10% and advantageously less than 20%. If the sum of these contents is greater than 20% or if the $Na_2O$ content is greater than 18% the hydrolytic resistance is strongly reduced. Glasses according to the invention are preferably free from lithium oxide $Li_2O$ on account of its high cost. An $Na_2O$ content between 10 and 15%, notably between 13.5 and 14.5% is preferred. The $K_2O$ content normally lies between 0 and 5%, preferably less than 1%, or even less than 0.5%.

Alkaline earth oxides make it possible to adapt the viscosity of the glass to the processing conditions.

A CaO content between 7 and 12%, notably between 7 and 10%, or even 8 and 9% is preferred.

MgO may be used up to approximately 10% and its elimination may be compensated for, at least partly, by an increase in the $Na_2O$ and/or $SiO_2$ content. Preferably, the MgO content is less than 5%. Low MgO contents make it possible moreover to reduce the number of raw materials necessary for melting the glass. The MgO content is preferably between 1 and 5%, notably between 2 and 5%. Surprisingly, the best results for energy transmission have been obtained for MgO contents between 1 and 5%, notably between 2.5 and 4.5%. The inventors have been able to demonstrate a surprising effect of the MgO content on the redox of glass, progressive substitution of CaO by MgO having the effect of reducing said redox, and therefore of increasing energy transmission. A reduction in CaO content moreover makes it possible to reduce the risk of the glass devitrifying and to widen the forming margin, enabling forming to be more stable.

BaO has a much smaller influence than CaO and MgO on the viscosity of glass and its content is essentially made to the detriment of alkali metal oxide, of MgO and especially of CaO. Any increase in BaO contributes to an increase in the viscosity of the glass at low temperatures. Preferably, glasses according to the invention are free from BaO and also strontium oxide (SrO), these elements having a high cost.

The glass according to the invention preferably has a $TiO_2$ content between 0 and 0.1%, notably between 0.01% and 0.05%.

Preferred compositions according to the invention are reproduced below:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |
| $SO_3$ | >0.2-0.4% |
| $Fe_2O_3$ (total iron) | 0 to 0.015%, |
| Redox | 0.2-0.30. |

Other preferred compositions according to the invention are reproduced below:

| | |
|---|---|
| $SiO_2$ | 65-75% |
| $Al_2O_3$ | 0-3% |
| CaO | 7-12% |
| MgO | 2-5% |
| $Na_2O$ | 10-15% |
| $K_2O$ | 0-5% |
| $SO_3$ | 0.1-0.3% |
| $Fe_2O_3$ (total iron) | 0 to less than 0.015%, |
| Redox | 0.1-0.3. |

Preferably, the glass sheet having such a composition has, for a thickness of 4 mm, a light transmission greater than or equal to 91%, an energy transmission greater than or equal to 90.2% over a wavelength range extending from 300 to 2500 nm, and an energy transmission greater than or equal to 90.5% over a wavelength range extending from 400 to 1100 nm, which corresponds to the range where the quantum efficiency of solar cells is at a maximum.

Other preferred compositions according to the invention are reproduced below:

| | |
|---|---|
| $SiO_2$ | 65-75% |
| $Al_2O_3$ | 0-5% |
| CaO | 7-12% |
| MgO | 1-5% |
| $Na_2O$ | 10-15% |
| $K_2O$ | 0-5% |
| $SO_3$ | 0.2-0.4% |
| $Fe_2O_3$ (total iron) | 0 to less than 0.015%, |
| Redox | 0.1-0.3. |

Preferably, the glass sheet having such a composition has, for a thickness of 4 mm, a light transmission greater than or equal to 91.2%, an energy transmission greater than or equal to 90.0% over a wavelength range extending from 300 to 2500 nm, and an energy transmission greater than or equal to 90.5% over a wavelength range extending from 400 to 1100 nm.

The glass composition may contain, apart from the inevitable impurities contained notably in the raw materials, a small proportion (up to 1%) of other constituents, for example agents assisting melting or refining of the glass (Cl etc), or furthermore elements coming from dissolution of the refractories serving for the construction of furnaces (for example $ZrO_2$). For the reasons already stated, the composition according to the invention preferably does not contain oxides such as $Sb_2O_3$, $As_2O_3$ or $CeO_2$.

The composition according to the invention preferably does not contain any agent absorbing visible or infrared radiation (notably for a wavelength between 380 and 1000 nm) other than those already mentioned. In particular, the composition according to the invention does not contain any of the following agents: oxides of the transition elements such as CoO, CuO, $Cr_2O_3$, NiO, $MnO_2$ and $V_2O_5$, oxides of the rare earths such as $CeO_2$, $La_2O_3$, $Nd_2O_3$ or $Er_2O_3$, or furthermore coloring agents in the elemental state such as Se, Ag and Cu. Among other agents preferably excluded are the oxides of the following elements: Sc, Y, Pr, Sm, Eu, Gd, Tb, Dy, Ho, Tm, Yb and Lu. These agents very often have an undesirable and very powerful coloring effect, manifesting itself at very low concentrations, sometimes of the order of a few ppm or less (1 ppm=0.0001%). Their presence thus very strongly reduces the transmission of the glass.

The glass sheet according to the invention preferably has, for a thickness of 3.2 mm, a light transmission $T_L$ at least 90%, notably 90.5% or even 91.0%. The light transmission, for a thickness of 4 mm, is preferably greater than or equal to 91%, notably 91.2%. Advantageously, the glass sheet according to the invention has, still for a thickness of 3.2 mm, an energy transmission $T_E$ of at most 91%. For a thickness of 4 mm, the energy transmission is preferably greater than or equal to 90.2%. For the same thickness, the energy transmission calculated for a wavelength range extending from 400 to 1100 nm, is preferably greater than or equal to 90.5%.

The object of the invention is finally the use of the glass sheet according to the invention in photovoltaic cells, solar cells, flat or parabolic mirrors for the concentration of solar energy, or furthermore for diffusers for back-lighting display screens of the LCD (liquid crystal screens) type. The glass sheet according to the invention may also be employed for interior applications (partitions, furnishings etc) or in domestic electrical goods (refrigerator storage shelves etc) or for glazing in the building construction or automobile fields. They may also be employed in screen or flat lamps based on organic electroluminescent dyes.

Generally, the object of the invention is also a photovoltaic cell, a solar cell, a flat or parabolic mirror for the concentration of solar energy, a diffuser for back-lighting display screens of the LCD type, a screen or flat lamp based on organic electroluminescent diodes, comprising at least one glass sheet according to the invention.

The glass sheet according to the invention may advantageously be covered by at least one thin transparent electroconducting layer and/or an anti-reflecting coating, preferably a thin transparent electroconducting layer on a first face and an anti-reflecting coating on a second face. According to the applications, other layers or multilayers may be deposited on one of other faces of the glass sheet. There may be a photocatalytic, self-cleaning or anti-soiling layer. There may also be layers or multilayers with a thermal function, notably anti-solar or low-emissive layers, for example multilayers comprising a silver layer protected by dielectric layers. There may moreover be a mirror layer, notably silver-based, or of a decorative layer such as a lacquer or enamel.

The glass sheet according to the invention may be incorporated in single or multiple glazing (notably double or triple glazing), in the sense where it may comprise several glass sheets providing a space filled with gas. The glazing may also be laminated and/or toughened and/or hardened and/or bowed.

In the case of applications in the photovoltaic field, and in order to maximize the energy yield of the cell, several improvements may be provided, cumulatively or alternatively:

the substrate may advantageously be coated with at least one thin transparent electroconducting layer, for example based on $SnO_2$:F, $SnO_2$:Sb, ZnO:Al or ZnO:Ga. These layers may be deposited on the substrate by various deposition methods, such as chemical vapor deposition (CVD) or cathode spray deposition, notably assisted by a magnetic field (magnetron method). In the CVD method, halide or organometallic precursors are vaporized and transported by a carrier gas to the surface of the hot glass, where they are decomposed under the effect of heat to form the thin layer. The advantage of the CVD method is that it is possible to put it into operation within the method for forming the glass sheet, notably when this consists of a float method. It is thus possible to deposit a layer when the glass sheet is on the bath of tin, on leaving the bath of tin, or in the lehr, that is to say the moment when the glass sheet is annealed in order to eliminate mechanical stresses. It is coated with a transparent electroconducting layer which may in its turn be coated with a semiconductor based on amorphous or polycrystalline silicon, with chalcopyrites (notably of the CIS—$CuInSe_2$ type or CIGS—$CuInGaSe_2$ type) or with CdTe to form a photovoltaic cell. This may notably consist of a thin second coat based on amorphous silicon, CIS or CdTe. In this case, another advantage of the CVD method lies in that a greater roughness is obtained, which generates a light-trapping phenomenon, which increases the quantity of photons absorbed by the semiconductor.

the substrate may be coated on at least one of its faces with an anti-reflecting coating. This coating may comprise a layer (for example based on porous silica with a low refractive index) or several layers. In the latter case a multilayer is preferred based on a dielectric material alternating with layers with high and low refractive indices and ending with a layer with a low refractive index. It may notably consist of a multilayer described in application WO 01/94989 or WO 2007/077373. The anti-reflecting layer may also include as the last layer a self-cleaning and anti-soiling layer based on photocatalytic titanium oxide, as taught in application WO 2005/110937. A low reflection may also be obtained that is durable with time. In applications in the photovoltaic field, the anti-reflecting layer is deposited on the outer face, namely the face in contact with the atmosphere, while any electroconducting transparent layer is deposited on the inner face, on the semiconductor side.

the surface of the substrate may be textured, for example having patterns (notably pyramidal), as described in applications WO 03/046617, WO 2006/134300, WO 2006/134301 or WO 2007/015017. These texturing effects are generally obtained by means of roll-forming the glass.

In the field of photovoltaic or solar cells, the glass sheet according to the invention preferably constitutes the protective cover for said cells. The glass sheet may be employed in all types of technologies: mono- or poly-crystalline silicon wafers, thin layers of amorphous silicon, CdTe, or CIS (copper indium selenide, $CuInSe_2$) or CIGS ($CuInGaSe_2$).

The invention is illustrated by the following non-limiting example.

Powdered raw materials (mainly sand, sodium carbonate, limestone and dolomite) were charged into a furnace with transverse burners and regenerators comprising 7 pairs of burners. The purity of the raw materials was such that the iron oxide content ($Fe_2O_3$) was only 0.0115%. The refining system employed was the sodium sulfate/coke couple. The burners employed fuel oil as the fuel and air as the oxidant. A glass bath was obtained that was then poured onto a bath of molten tin in order to obtain a 3.85 mm glass sheet according to the method usually known under the name "float method".

According to a comparative example, the 7 pairs of overhead burners were fed by a stoichiometric mixture. The redox obtained was 0.42, and the sulfate content was 0.25% $SO_3$. The energy transmission ($T_E$) calculated according to ISO standard 9050 was, for a thickness of 3.85 mm, 90.0%.

In the example according to the invention, the 3 pairs of burners situated most downstream were fed with an over-stoichiometric quantity of oxidant, so that the molar ratio O2/fuel was 1.1. The redox of the glass sheet obtained fell to 0.27, which was accompanied by an increase in energy transmission to 90.7%, and even to 0.25 for an energy transmission of 90.9%. The hearth temperature in the region of the hot spot remained below 1350° C., which did not affect the life of the furnace.

The compositions tested are reproduced in table 1 below. Concentrations are indicated in percentages by weight. The optical properties are as follows, for a thickness of 3.85 mm:

the energy transmission (TE) calculated according to ISO standard 9050:2003 the overall light transmission factor (TL), calculated between 380 and 780 mm, within the meaning of ISO standard 9050:2003, then taking into consideration the D65 illuminant as defined in ISO/CIE standard 10526 and the standard colorimetric observer C.I.E. 1931 as defined by ISO/CIE standard 10527.

TABLE 1

|  | C1 | 1 | 2 |
|---|---|---|---|
| $SiO_2$ | 71.86 | 71.86 | 71.86 |
| $Al_2O_3$ | 0.53 | 0.53 | 0.53 |
| $TiO_2$ | 0.01 | 0.01 | 0.01 |
| CaO | 9.4 | 9.4 | 9.4 |
| MgO | 4.0 | 4.0 | 4.0 |
| $Na_2O$ | 14.0 | 14.0 | 14.0 |
| $K_2O$ | 0.01 | 0.01 | 0.01 |
| $SO_3$ | 0.25 | 0.25 | 0.25 |
| $Fe_2O_3$ | 0.0090 | 0.0090 | 0.0090 |
| Redox | 0.42 | 0.27 | 0.25 |
| TL (%) | 91.2 | 91.5 | 91.5 |
| TE (%) | 90.0 | 90.7 | 90.9 |

Example C1 is a comparative example, obtained by traditional production methods, thus with burners not operating with an oxygen over-stoichiometry.

Table 2 below illustrates the influence of the MgO content on the redox.

TABLE 2

|  | 3 | 4 | 5 | 6 | 7 | 8 |
|---|---|---|---|---|---|---|
| $SiO_2$ | 72.7 | 72.5 | 72.4 | 72.4 | 72.3 | 72.3 |
| $Al_2O_3$ | 1.04 | 1.04 | 1.02 | 1.02 | 1.02 | 1.02 |
| $TiO_2$ | 0.03 | 0.03 | 0.03 | 0.03 | 0.03 | 0.03 |
| CaO | 12.3 | 11.4 | 10.4 | 9.4 | 8.4 | 7.4 |
| MgO | — | 1.0 | 2.0 | 3.0 | 4.0 | 5.0 |
| $Na_2O$ | 13.4 | 13.5 | 13.8 | 13.7 | 13.8 | 13.8 |
| $K_2O$ | 0.02 | 0.02 | 0.02 | 0.02 | 0.02 | 0.02 |
| $SO_3$ | 0.36 | 0.33 | 0.35 | 0.30 | 0.32 | 0.30 |
| $Fe_2O_3$ | 0.0090 | 0.0096 | 0.0104 | 0.0124 | 0.0116 | 0.0125 |
| Redox | 0.19 | 0.14 | 0.15 | 0.13 | 0.12 | 0.11 |

The invention claimed is:

1. A glass production method, comprising:

charging raw materials in an upstream part of a furnace, wherein a plurality of burners are disposed along the upstream part, obtaining a mass of molten glass, and then leading said mass of molten glass to a zone of the furnace situated further downstream, wherein at least one burner is disposed in the region of this zone being fed with an over-stoichiometric quantity of oxidant, and then, forming a glass sheet, said glass sheet having a chemical composition that comprises the following constituents in an amount varying within the weight limits defined hereinafter:

| $SiO_2$ | 60-75%; |
|---|---|
| $Al_2O_3$ | 0-10%; |
| $B_2O_3$ | 0-5%; |
| CaO | 5-15%; |
| MgO | 0-10%; |
| $Na_2O$ | 5-20%; |
| $K_2O$ | 0-10%; |
| BaO | 0-5%; |
| $SO_3$ | 0.2-0.4%; |
| $Fe_2O_3$ (total iron) | 0 to 0.015%; and |
| Redox | 0.2-0.3%. |

2. The method as claimed in claim 1, wherein the furnace comprises several overhead burners disposed in the region of the sidewalls of the furnace, each of said burners being able to develop a flame transversely to the axis of the furnace.

3. The method as claimed in claim 2, wherein the overhead burners are disposed regularly upstream to downstream and are arranged in pairs of burners facing each other, the burners of each pair operating alternately so that at a given instant only burners disposed in the region of one of the sidewalls develop a flame.

4. The method as claimed in claim 3, wherein the furnace comprises between 6 and 8 pairs of burners and only the two or three pairs of burners situated furthest downstream, or the last pair of burners situated furthest downstream, are fed with an over-stoichiometric quantity of oxidant.

5. The method as claimed in claim 1 wherein the furnace comprises, from upstream to downstream, a first chamber delimiting a glass melting zone and then a refining zone and then a second chamber delimiting a cooling zone for molten glass, all the burners being disposed in the region of the first chamber.

6. The method as claimed in claim 5, wherein each burner fed with an over-stoichiometric quantity of oxidant is situated in the region of the glass refining zone.

7. The method as claimed in claim 1, wherein the burners are fed with air and fuel.

8. The method as claimed in claim 7, wherein the fuel is chosen from natural gas and fuel oil or any mixtures thereof.

9. The method as claimed in claim 1, wherein the over-stoichiometric quantity of oxidant is such that the molar ratio of oxygen to fuel is between 1.05 and 1.5.

10. The method as claimed in claim 1, wherein the glass sheet is formed by floating on a bath of tin.

* * * * *